(12) United States Patent
Schreter

(10) Patent No.: US 9,069,704 B2
(45) Date of Patent: Jun. 30, 2015

(54) DATABASE LOG REPLAY PARALLELIZATION

(75) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 258 days.

(21) Appl. No.: 13/290,786

(22) Filed: Nov. 7, 2011

(65) Prior Publication Data

US 2013/0117236 A1  May 9, 2013

(51) Int. Cl.
  *G06F 7/00* (2006.01)
  *G06F 11/14* (2006.01)
  *G06F 17/30* (2006.01)

(52) U.S. Cl.
  CPC ...... *G06F 11/1412* (2013.01); *G06F 17/30356* (2013.01); *G06F 17/30377* (2013.01); *G06F 17/30348* (2013.01); *G06F 2201/80* (2013.01)

(58) Field of Classification Search
  USPC ............ 707/999.101, 999.102, 615, 648
  See application file for complete search history.

(56) References Cited

U.S. PATENT DOCUMENTS

| | | | |
|---|---|---|---|
| 5,170,480 A * | 12/1992 | Mohan et al. .................. | 1/1 |
| 6,732,123 B1 * | 5/2004 | Moore et al. ................... | 1/1 |
| 7,509,653 B2 * | 3/2009 | Das et al. ....................... | 719/318 |
| 2002/0103815 A1 * | 8/2002 | Duvillier et al. ............... | 707/203 |
| 2002/0178177 A1 * | 11/2002 | Park et al. ...................... | 707/202 |
| 2004/0098425 A1 * | 5/2004 | Wiss et al. ...................... | 707/204 |
| 2008/0147673 A1 * | 6/2008 | Candea et al. ................. | 707/10 |
| 2008/0235298 A1 * | 9/2008 | Lin et al. ........................ | 707/202 |
| 2010/0011026 A1 * | 1/2010 | Saha et al. ..................... | 707/200 |
| 2010/0169284 A1 * | 7/2010 | Walter et al. .................. | 707/682 |

* cited by examiner

*Primary Examiner* — Hosain Alam
*Assistant Examiner* — Eliyah S Harper
(74) *Attorney, Agent, or Firm* — Mintz Levin Cohn Ferris Glovsky and Popeo, P.C.

(57) ABSTRACT

A plurality of transactions are executed in a data storage application. As a result, log entries according to the plurality of transactions are stored in at least one log. During a data recovery operation, log entries from the log are dispatched into a plurality of worker queues. Each worker queue corresponds to a different one of a plurality of logical central processing units. The log entries are replayed using the plurality of worker queues such that log entries associated with a same object are executed serially by a single worker queue and at least a portion of the log entries associated with different objects are executed in parallel by different worker queues. Related apparatus, systems, techniques and articles are also described.

11 Claims, 4 Drawing Sheets

DATABASE LOG REPLAY PARALLELIZATION

TECHNICAL FIELD

The subject matter described herein relates to techniques for data recovery using parallel worker queues operating in parallel.

BACKGROUND

Conventional databases typically use logging to store operations performed on corresponding data in a synchronous fashion to a log while, at the same time, writing data to a corresponding data area asynchronously. In cases of a crash or other data recovery event, the data area is recovered to a potentially older state. Replaying the log will bring the database to the last committed state. Single threaded execution to replay the log can cause significant delays especially in cases where there are numerous smaller transactions such as with OLTP.

SUMMARY

In one aspect, a plurality of transactions are executed in a data storage application. As a result, log entries according to the plurality of transactions are stored in at least one log. During a data recovery operation, log entries from the log are dispatched into a plurality of worker queues. Each worker queue corresponds to a different one of a plurality of logical central processing units. The log entries are replayed using the plurality of worker queues such that log entries associated with a same object are executed serially by a single worker queue and at least a portion of the log entries associated with different objects are executed in parallel by different worker queues.

A synthetic log record can be inserted into at least a portion of the worker queues. Each synthetic log record can specify replay operations to be performed by the corresponding worker queue. The replay operations can be synchronized across all worker queues, and/or synchronized across all worker queues used inside one transaction. At least one synthetic log record can comprise a savepoint log record across all worker queues to persist a current replay state and such savepoint log record can be processed synchronously by all worker queues. The synthetic log records can comprise log records inserted in response to a commit or rollback of a transaction wherein such log records are processed asynchronously by respective worker queue for transactions started during log replay and synchronously for transactions already active when the replay of the log started.

Each log entry can have an associated object identification (ID) such that log entries having the same object ID are handled by a single worker queue. Log entries having a same object ID can be executed serially by a single worker queue and at least a portion of log entries having different object IDs are executed by different worker queues in parallel. Each object ID can be hashed to an identification of a worker queue using a modulo operation.

Articles of manufacture are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, database log replay can be more rapidly performed by using multiple workers (i.e., logical central processing units, etc.) as opposed to single threaded execution.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
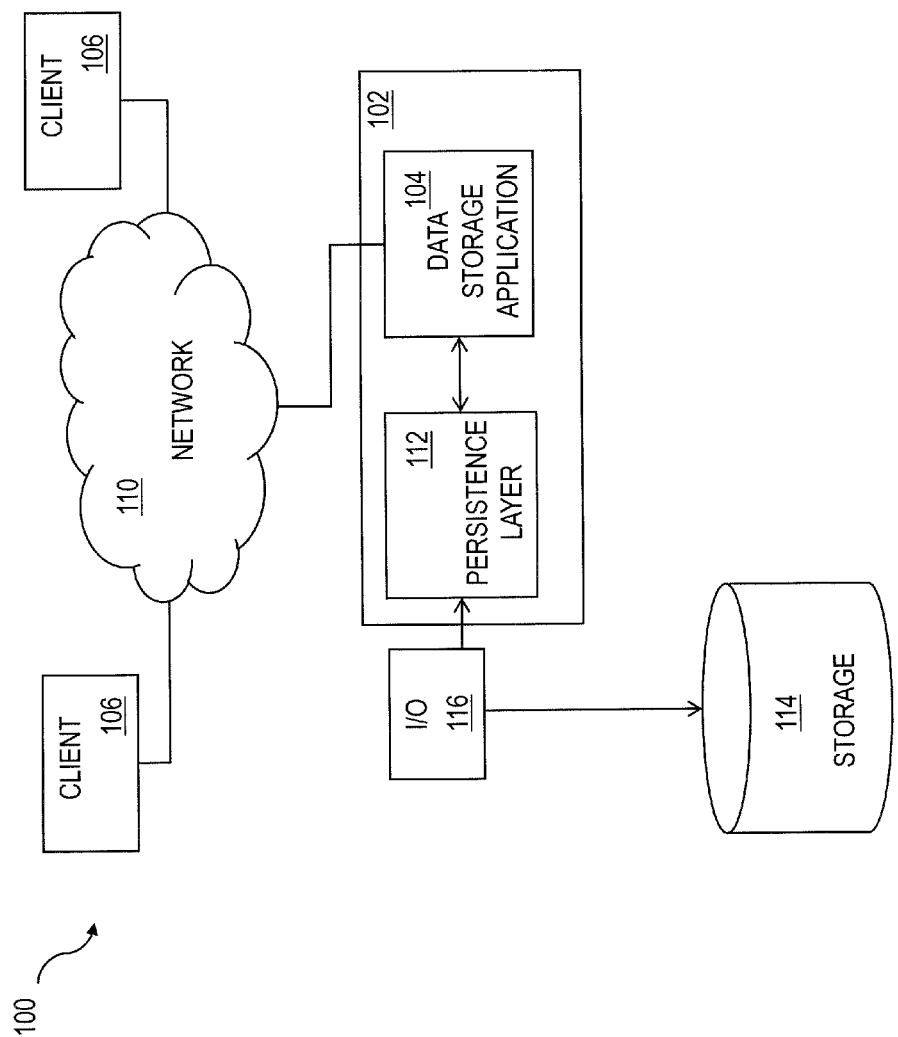
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
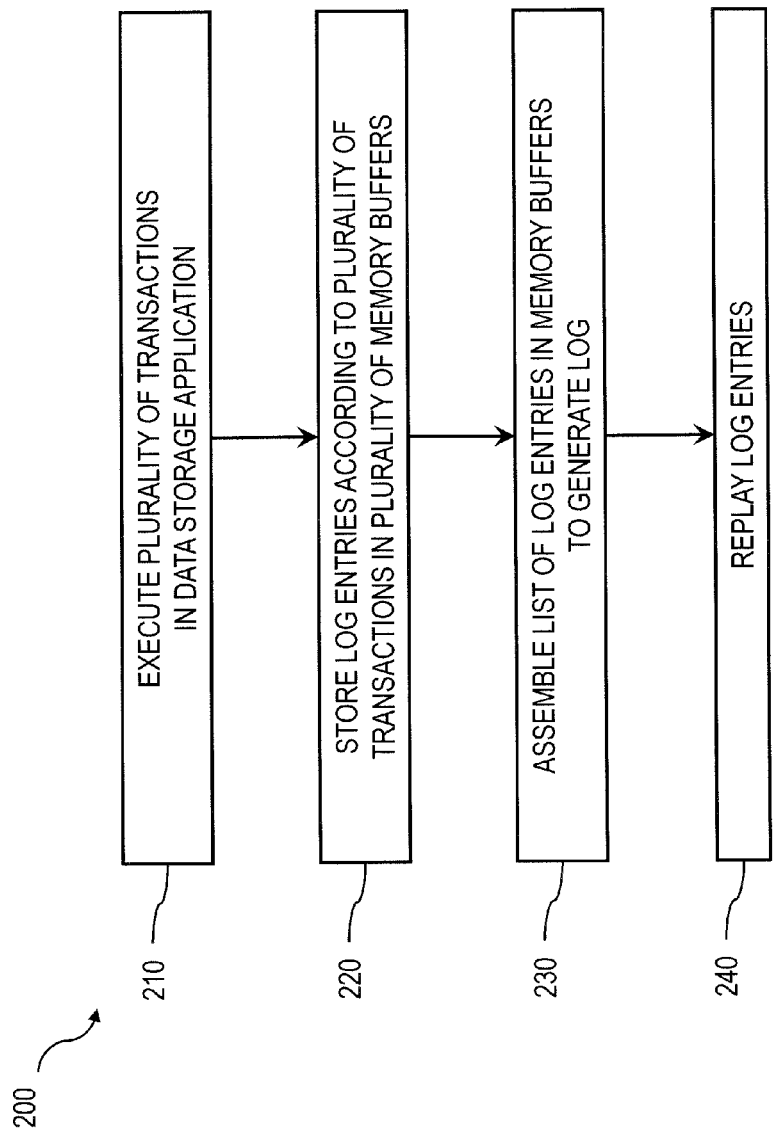
FIG. 2 is a process flow diagram illustrating parallel replay of logged database transactions.

FIG. 2 is a process flow diagram 200 in which, at 210, a plurality of transactions are executed in a data storage application. Concurrently, at 220, log entries according to the plurality of transactions are stored in at least one log. Subsequently at 230, during a data recovery operation, log entries are dispatched from the log into a plurality of worker queues. Each worker queue corresponding to a different one of a plurality of workers (e.g., logical central processing units, etc.). Using these worker queues, the log entries are replayed, at 240, such that log entries associated with a same object are executed serially by a single worker queue and at least a portion of the log entries associated with different objects are executed in parallel by different worker queues.

Figure 3:
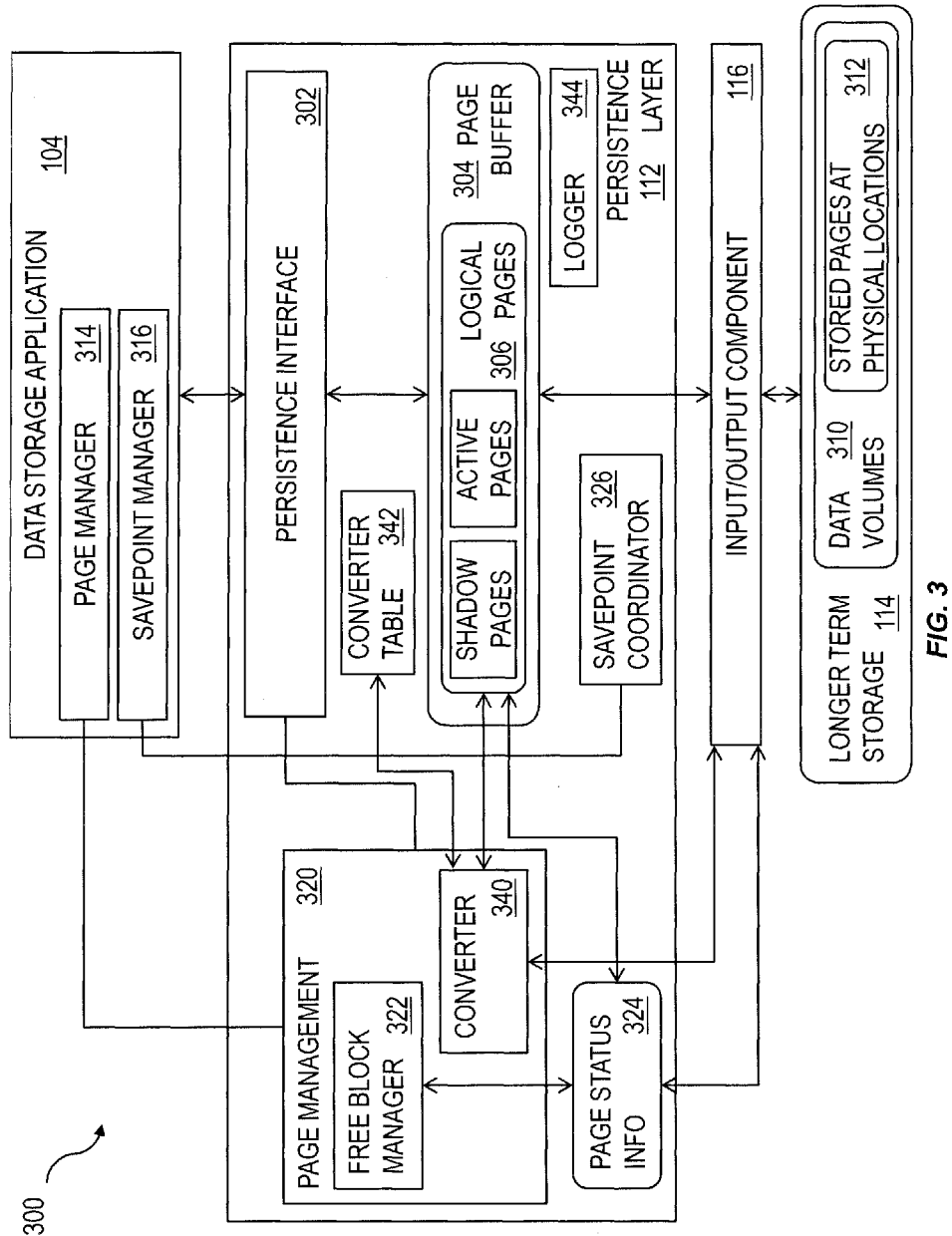
FIG. 3 is a diagram illustrating details of the system of FIG. 1.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, and optionally can include shadow pages 311, active pages 313, data pages of virtual files 315 and the like. The logical pages 306 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include a row store 303 and a column store 305. The row store 303 can comprise or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash. The row store 303 can access the persistence interface 302 via an absolute page API 307. The column store 305 which can store columns in contiguous memory can access the persistence interface 302 via a virtual file API 309.

In some implementations of a data storage application 104, the page management module of the persistence layer 112 can implement shadow paging. The free block manager 322 within the page management module 320 can maintain the status of physical pages. The page buffer 304 can included a fixed page status buffer that operates as discussed herein. A converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 344 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 344 whenever a change is made. This information can be written to disk at latest when the transaction ends. The log entries can be persisted in separate log volumes 317 while normal data is written to data volumes 310. With a redo log, committed changes can be restored even if the corresponding data pages were not written to disk. For undoing uncommitted changes, the persistence layer 112 can use a combination of undo log entries (from one or more logs) and shadow paging.

The persistence interface 302 can handle read and write requests of stores (e.g., in-memory stores, etc.). The persistence interface 302 can also provide write methods for writing data both with logging and without logging. If the logged write operations are used, the persistence interface 302 invokes the logger 344. In addition, the logger 344 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 344. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 344 is invoked for writing log entries, it does not immediately write to disk. Instead it can put the log entries into a log queue in memory. The entries in the log queue can be written to disk at the latest when the corresponding transaction is finished (committed). To guarantee that the committed changes are not lost, the commit operation is not successfully finished before the corresponding log entries are flushed to disk. Writing log queue entries to disk can also be triggered by other events, for example when log queue pages are full or when a savepoint is performed.

The logger 344 can write a linear log written either to a single log partition or across several log partitions as described in co-pending U.S. patent application Ser. No. 13/290,286 filed Nov. 7, 2011, the contents of which are hereby fully incorporated by reference. With a linear log, log entries are read from the log in the same order as they were written in on-line mode. During recovery (in response to, for example, a data recovery event), log entries can be processed directly in this order sequentially, without any synchronization. This processing can recreate exactly the same state as in on-line mode, but at the cost of single-threaded execution using conventional techniques.

Figure 4:
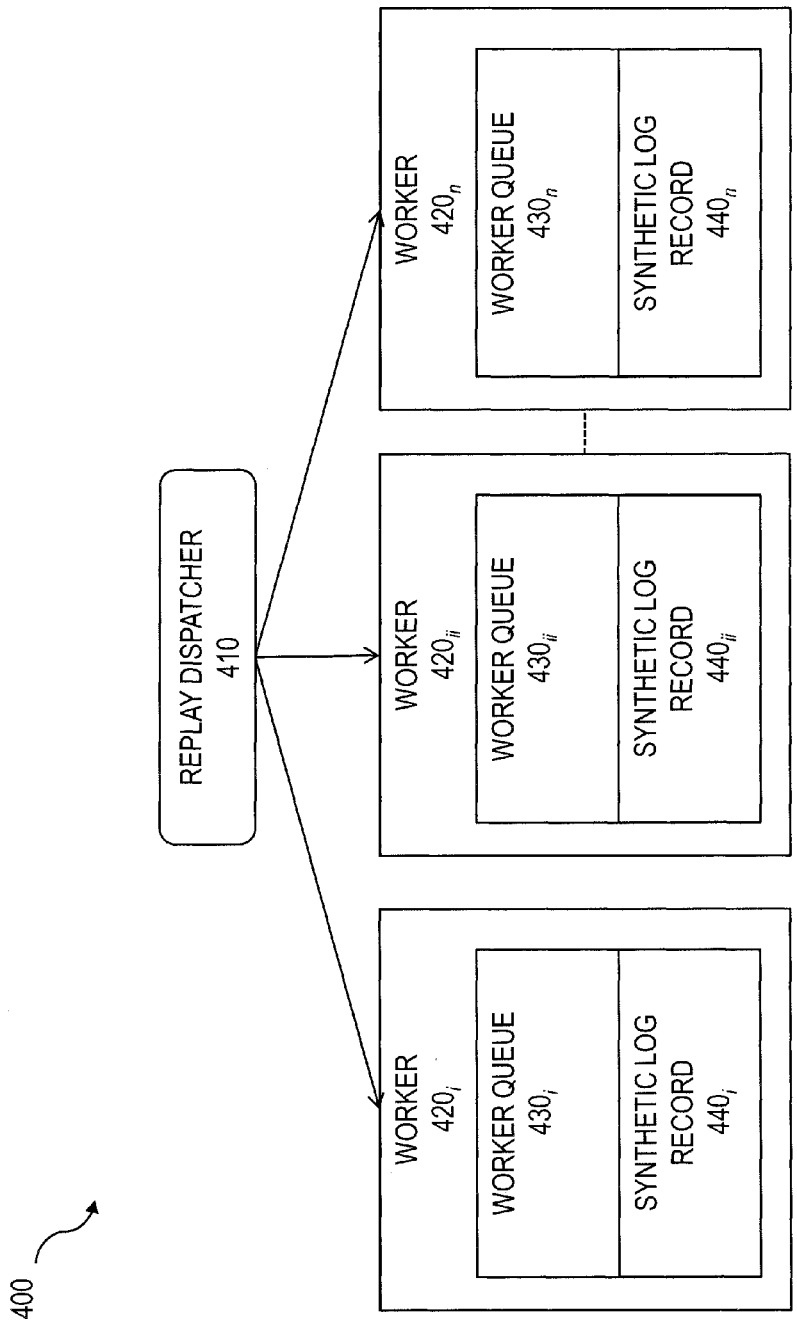
FIG. 4 is a diagram illustrating a plurality of workers replaying logged database transactions in respective worker queues.

The current techniques take advantage of trends utilizing numerous CPUs and memory by parallelizing operations. As illustrated in the diagram 400 of FIG. 4, a log replay dispatcher 410 can dispatch individual log entries into several worker queues $430_{i\ldots n}$ (e.g., as many as there are logical CPUs) each being executed by a respective worker $420_{i\ldots n}$. The log replay dispatcher 410 can also handle point-in-time recovery and synchronous entries (such as commit/rollback), by inserting a synthetic log record $440_{i\ldots n}$ into each (or several) recovery worker queues.

As the recovery is running in parallel, care must be taken to ensure proper coordination. Each redo log record handler can define a method to query object ID. All log records on the same object ID must be executed serially while log records on different object IDs can be executed in parallel. Thus, one object is always handled by the same worker $420_{i\ldots n}$ (e.g., by hashing object ID to worker ID using modulo operation). For instance, object ID can be a unique ID of a data container to allow parallel recovery of containers, but serialize by container. Thus, the actual redo action can assume serial execution for respective objects, which simplifies redo handling greatly (i.e., basically, single-threaded, serialized operation can be assumed, etc.). Special care has to be taken only on globally-synchronizing actions, such as transaction end (commit/rollback) or point-in-time for point-in-time recovery.

For point-in-time, a synthetic log record $440_{i\ldots n}$ is sent to each worker queue $430_{i\ldots n}$. The processing of this synthetic log $440_{i\ldots n}$ entry can act to synchronize all workers and call appropriate code to process whatever is necessary after reaching this point-in-time (e.g., writing a savepoint/snapshot, etc.). In parallel, other log entries can be already dispatched by the log replay dispatcher 410 to the workers $420_{i\ldots n}$, so after point-in-time callback is finished, normal processing can continue.

Commit and rollback processing can be performed in a similar fashion. In most cases it can be sufficient to synchronize all workers $410_{i\ldots n}$ as in point-in-time recovery, but such an arrangement can create unnecessary synchronization overhead (especially with regard to OLTP which tends to have numerous small transactions). Such synchronization is only needed for transactions which have started before log replay (i.e., which were active during the crash of the database, etc.). For all other transactions, only workers $410_{i\ldots n}$ involved in the transaction must be notified about the transaction end by sending synthetic commit/rollback entries to those workers. As operations in individual workers are distributed by container ID, actual commit and rollback processing within worker queues $420_{i\ldots n}$ do not have dependencies on other workers (except for aforementioned old transactions). Thus, the actual commit/rollback processing does not have to synchronize across workers and can be completely parallelized with other operations. Stated differently, if two transactions touched the same worker queue $430_{i\ldots n}$, this also implicitly synchronizes commits of those transactions to be executed in same order as during online operation. On the other hand, if two transactions run on different objects, or if one transaction touches to different objects, there is no synchronization at all.

Further, for transactions which started after the savepoint from which the recovery is based (i.e., transactions which are completely stored in the log), there is no synchronization necessary; only a synthetic log record $440_{i\ldots n}$ for commit or rollback is written to all worker queues $430_{i\ldots n}$ which were affected by this transaction. The reason is, there cannot be any undo/cleanup dependency between worker queues $430_{i\ldots n}$, because for each worker queue $430_{i\ldots n}$ and transaction combination, there are private undo/cleanup operation queues being written, which can then run also completely in parallel during respective commit/rollback processing on each worker queue $430_{i\ldots n}$. For transactions running at the savepoint time, there is no such worker-private queue, but only one global queue for the transaction, so synchronization is necessary. Therefore, after all transactions which were running at the time of the savepoint from which the recovery is based are closed during recovery, there is generally no synchronization anymore between worker queues $430_{i\ldots n}$.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer program product storing instructions that, when executed by at least one programmable processor, cause the at least one programmable processor to perform operations comprising:
   executing a plurality of transactions in a data storage application;
   storing log entries according to the plurality of transactions in at least one log;
   dispatching, during a data recovery operation, log entries from the at least one log into a plurality of worker queues, each worker queue corresponding to a different one of a plurality of logical central processing units;
   sending a synthetic log record to at least a portion of the worker queues that enables point-in-time recovery by synchronizing such worker queues and calling code after reaching a specified point-in-time; and
   replaying the log entries using the plurality of worker queues such that log entries associated with a same object are executed serially by a single worker queue and at least a portion of the log entries associated with different objects are executed in parallel by different worker queues;
   wherein each synthetic log record specifies replay operations to be performed by the corresponding worker queue;
   wherein the synthetic log records comprise log records inserted in response to a commit or rollback of a transaction and wherein such log records are processed asynchronously by respective worker queue for transactions started during log replay and synchronously for transactions already active when the replay of the log started.

2. A computer program product as in claim 1, wherein the replay operations are synchronized across all worker queues.

3. A computer program product as in claim 2, wherein at least one synthetic log record comprises a savepoint log record across all worker queues to persist a current replay state, and wherein such savepoint log record is processed synchronously by all worker queues.

4. A computer program product as in claim 1, wherein each log entry has an associated object identification (ID), wherein log entries having the same object ID are handled by a single worker queue.

5. A computer program product as in claim 4, wherein log entries having a same object ID are executed serially by a single worker queue and at least a portion of log entries having different object IDs are executed by different worker queues in parallel.

6. A computer program product as in claim 4, wherein each object ID is hashed to an identification of a worker queue using a modulo operation.

7. A method comprising:
   executing a plurality of transactions in a data storage application;
   storing log entries according to the plurality of transactions in at least one log;
   dispatching, during a data recovery operation, log entries from the at least one log into a plurality of worker queues, each worker queue corresponding to a different one of a plurality of logical central processing units;
   sending a synthetic log record at least a portion of the worker queues that enables point-in-time recovery by synchronizing such worker queues and calling code after reaching a specified point-in-time; and
   replaying the log entries using the plurality of worker queues such that log entries associated with a same object are executed serially by a single worker queue and at least a portion of the log entries associated with different objects are executed in parallel by different worker queues;
   wherein each synthetic log record specifies replay operations to be performed by the corresponding worker queue;
   wherein the synthetic log records comprise log records inserted in response to a commit or rollback of a transaction and wherein such log records are processed asynchronously by respective worker queue for transactions started during log replay and synchronously for transactions already active when the replay of the log started.

8. A method as in claim 7, wherein at least one synthetic log record comprises a savepoint log record across all worker queues to persist a current replay state, and wherein such savepoint log record is processed synchronously by all worker queues.

9. A method as in claim 7, wherein each log entry has an associated object identification (ID), wherein log entries having the same object ID are handled by a single worker queue.

10. A method as in claim 9, wherein log entries having a same object ID are executed serially by a single worker queue and at least a portion of log entries having different object IDs are executed by different worker queues in parallel; and wherein each object ID is hashed to an identification of a worker queue using a modulo operation.

11. A system comprising:

at least one programmable processor;

memory coupled to the at least one programmable processor for storing instructions to cause the at least one programmable processor to perform operations comprising:

executing a plurality of transactions in a data storage application;

storing log entries according to the plurality of transactions in at least one log;

dispatching, during a data recovery operation by a log replay dispatcher, log entries from the at least one log into a plurality of worker queues, each worker queue corresponding to a different one of a plurality of logical central processing units;

sending a synthetic log record to at least a portion of the worker queues that enables point-in-time recovery by synchronizing such worker queues and calling code after reaching a specified point-in-time; and replaying the log entries using the plurality of worker queues such that log entries associated with a same object are executed serially by a single worker queue and at least a portion of the log entries associated with different objects are executed in parallel by different worker queues;

wherein each synthetic log record specifies replay operations to be performed by the corresponding worker queue;

wherein the synthetic log records comprise log records inserted in response to a commit or rollback of a transaction and wherein such log records are processed asynchronously by respective worker queue for transactions started during log replay and synchronously for transactions already active when the replay of the log started.

* * * * *